Jan. 5, 1971  L. A. WRIGHT  3,552,794
CRANE COUPLING
Filed Oct. 16, 1967  5 Sheets-Sheet 4
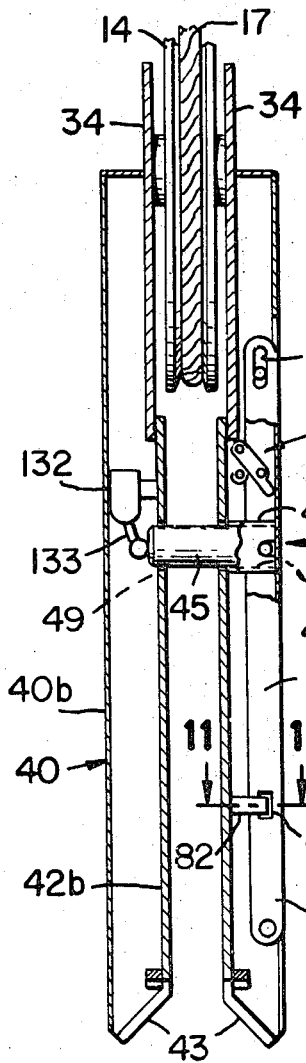
FIG_8
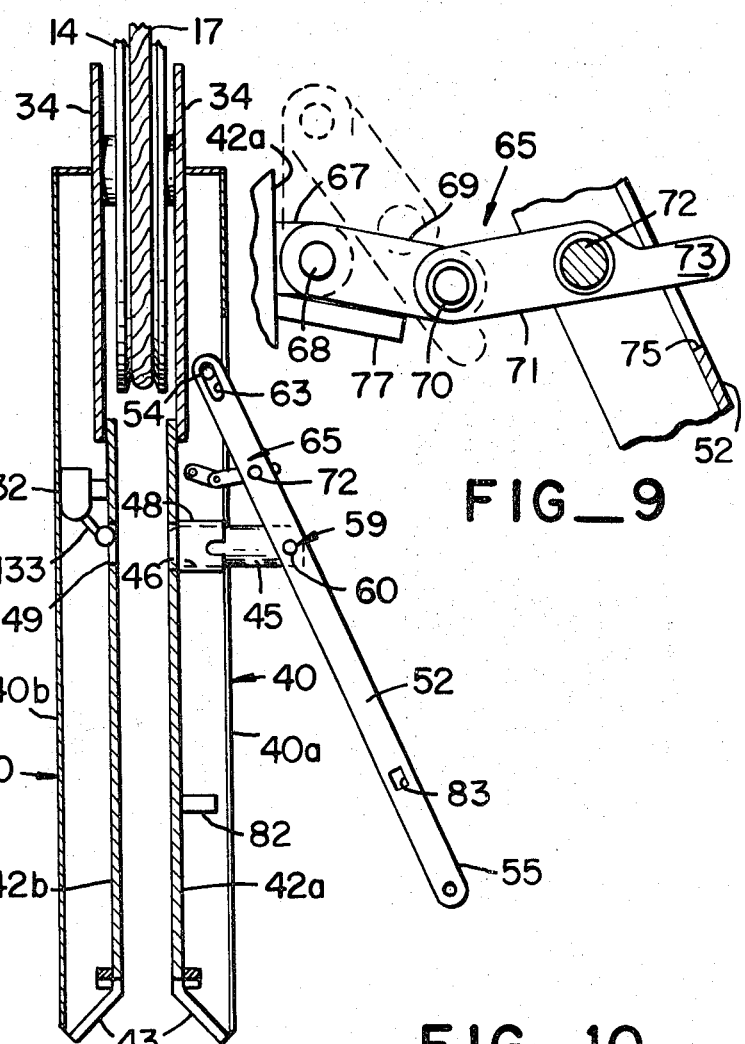
FIG_7
FIG_9
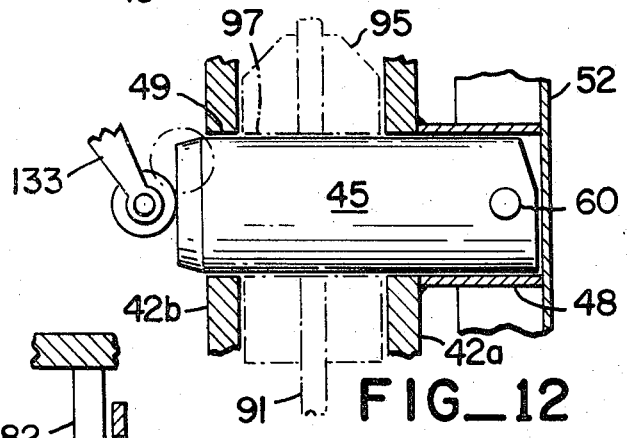
FIG_12
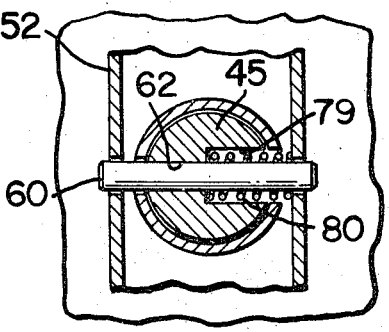
FIG_10
FIG_11
INVENTOR.
LAWRENCE A. WRIGHT
BY
Townsend and Townsend
ATTORNEYS

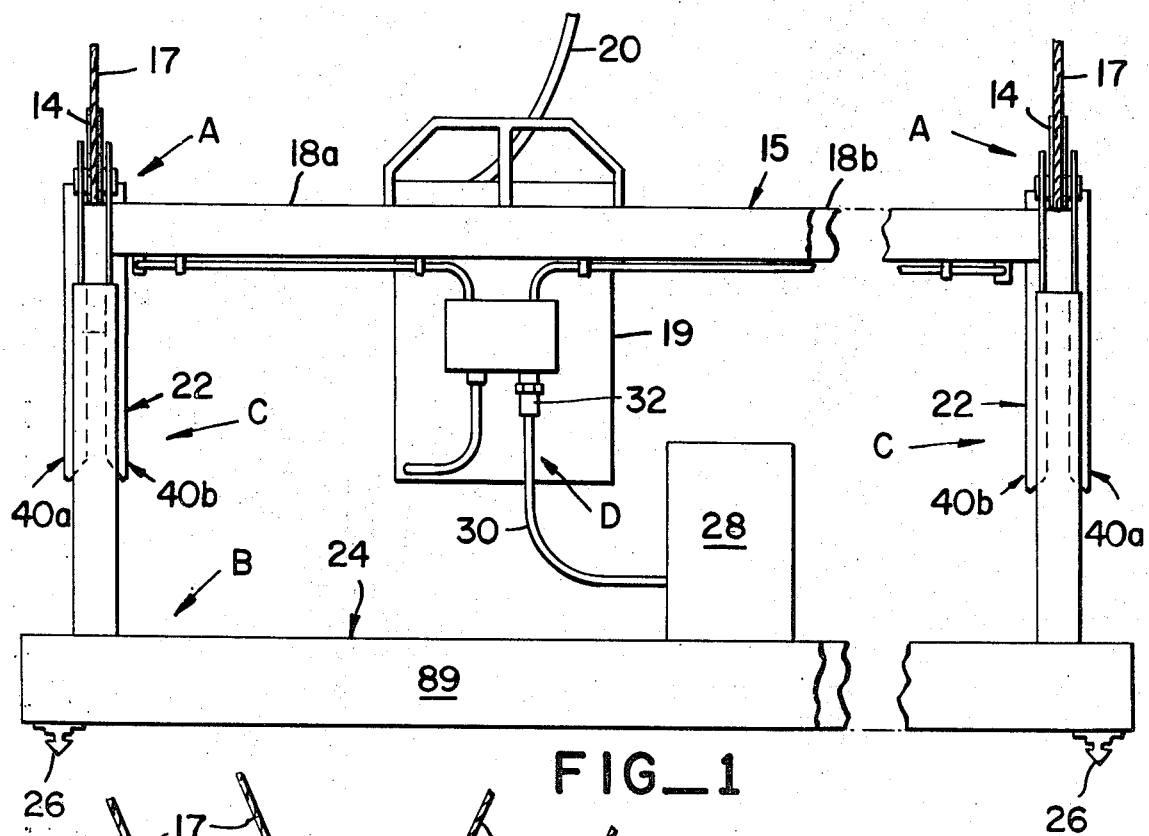
FIG_1
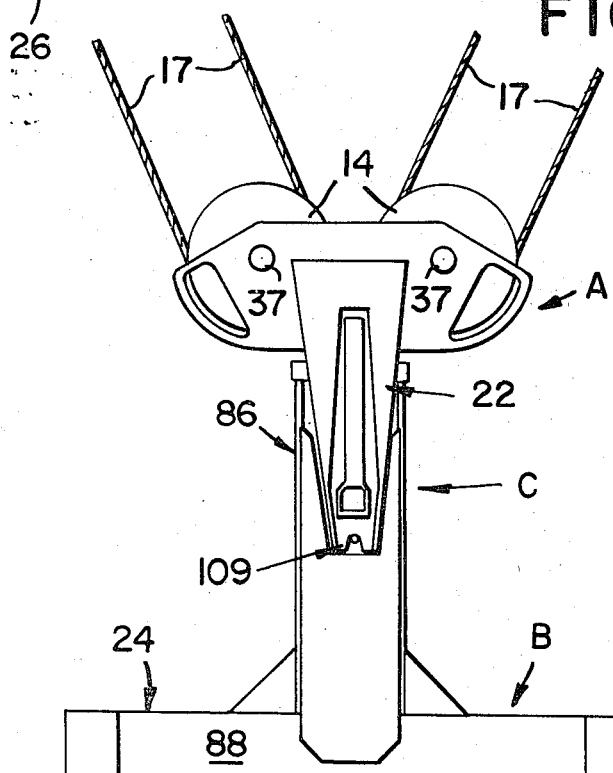
FIG_2
INVENTOR.
LAWRENCE A. WRIGHT
BY
ATTORNEYS

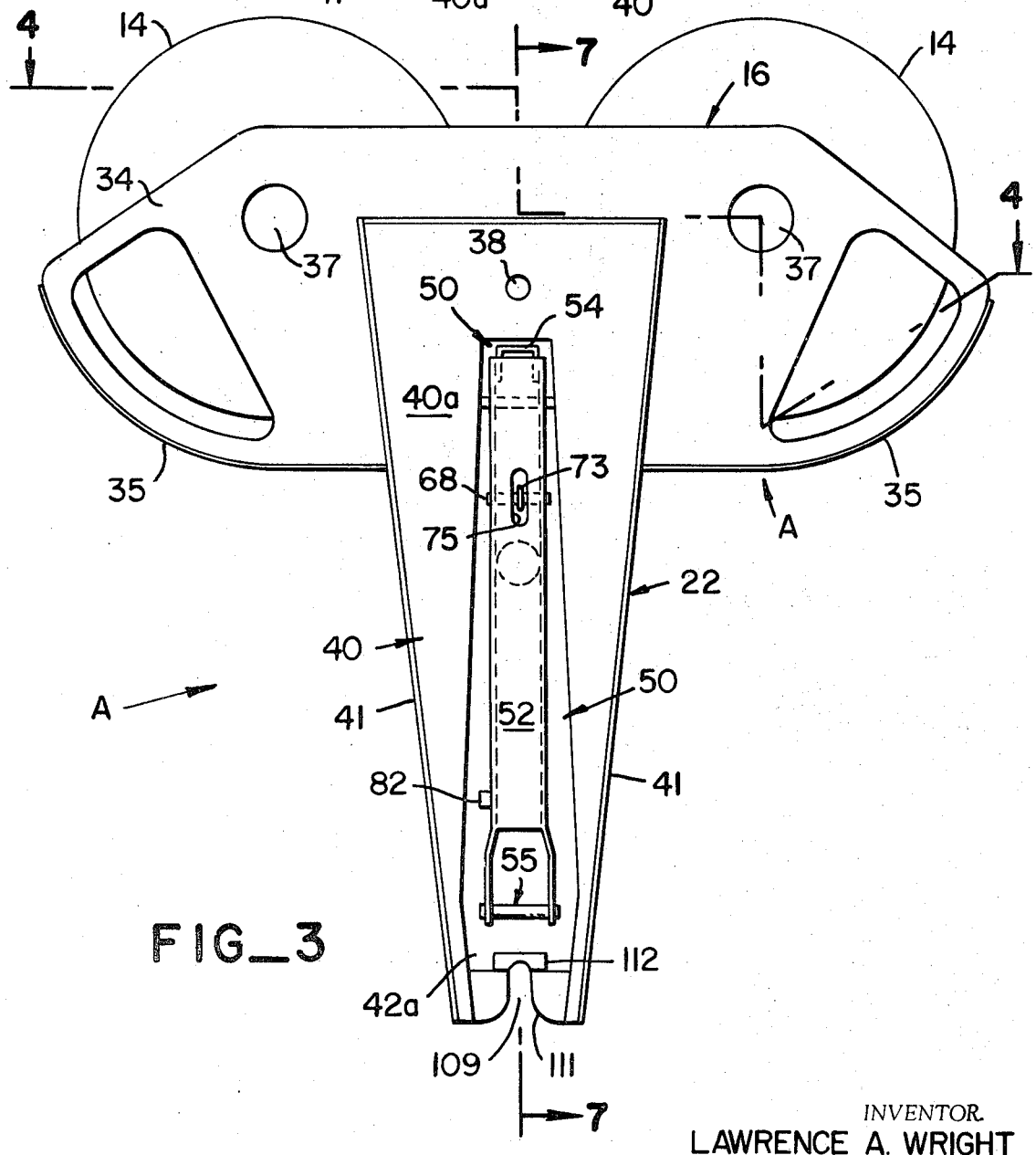

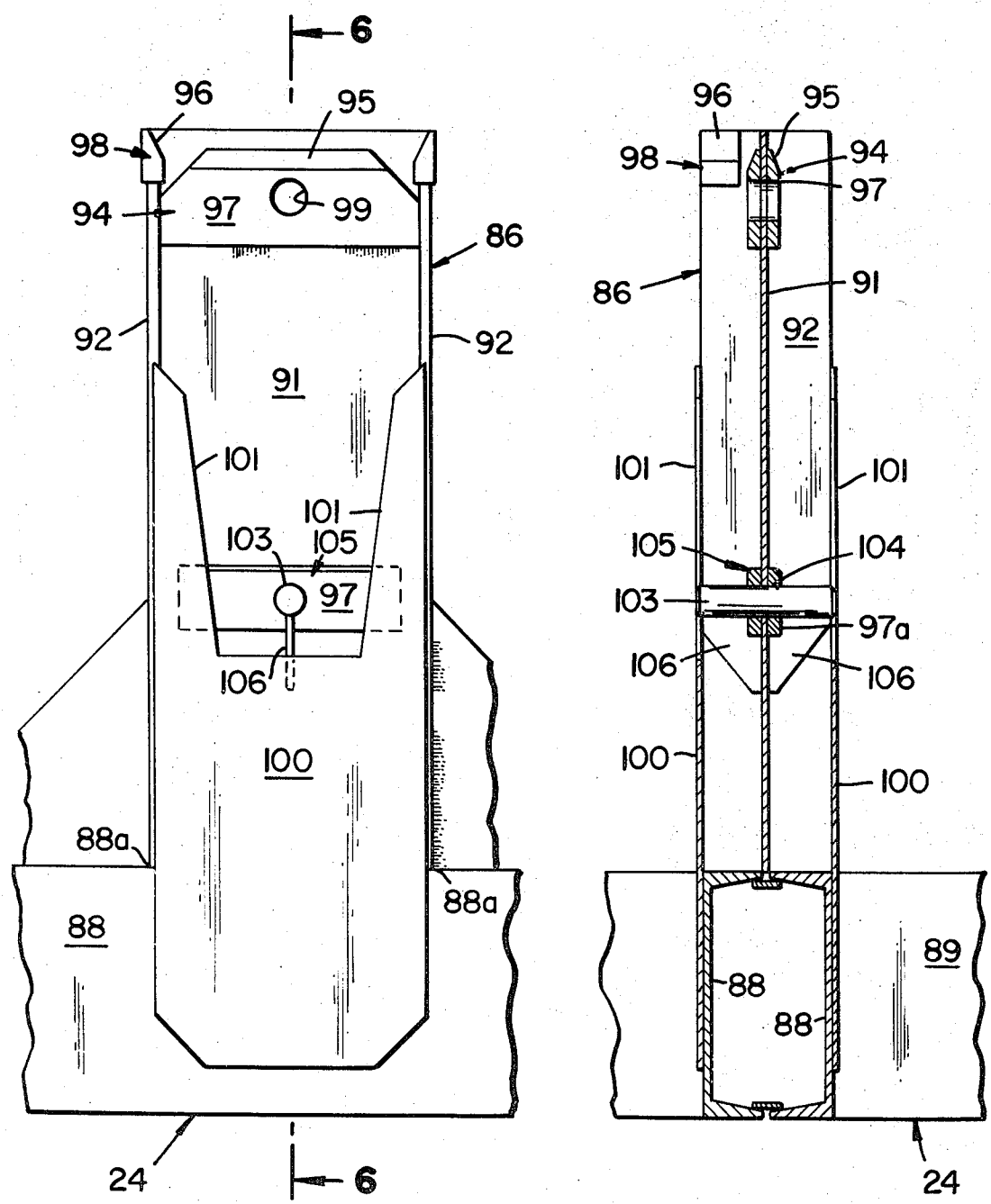

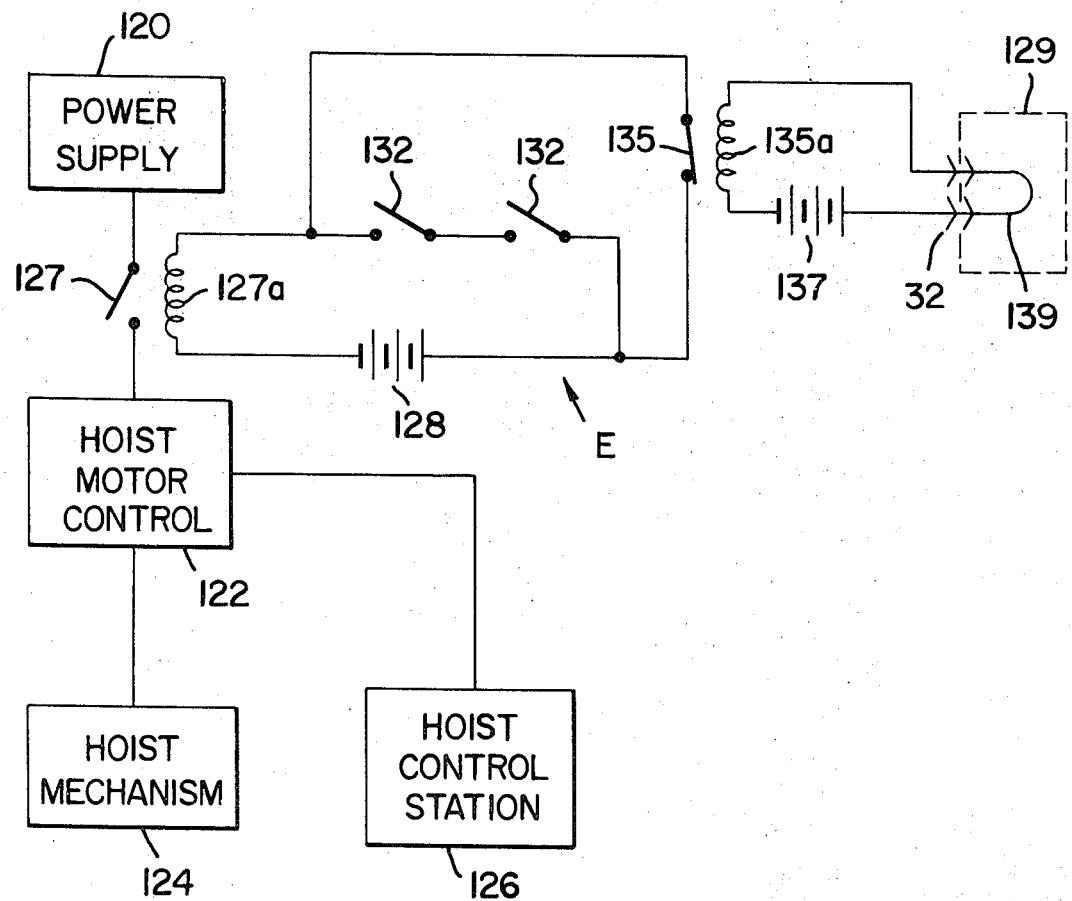
FIG_13

… … …

United States Patent Office 3,552,794
Patented Jan. 5, 1971

3,552,794
CRANE COUPLING
Lawrence A. Wright, Alameda, Calif., assignor to Pacific Coast Engineering Company, Alameda, Calif.
Filed Oct. 16, 1967, Ser. No. 675,488
Int. Cl. B66c *1/10*
U.S. Cl. 294—81                                     2 Claims

ABSTRACT OF THE DISCLOSURE

A crane coupling permitting rapid interchange of connection between a crane hoist block or other lifting apparatus and one of a plurality of remotely-actuated spreaders of differing sizes, wherein each size of spreader is designed for handling uniformly sized cargo articles or containers of common dimension. To permit rapid change of such spreaders, the lifting apparatus hoist block and selected spreader each have complementary attachment members. These attachment members are adapted for quickly gathering and aligning the hoist block and spreader so as to guide them into slidable engagement to a position of registry. In the position of registry, a pin mounted for reciprocal movement with respect to one of the attachment members penetrates through an aperture defined in the other of the members in order to effect the desired attachment. As attached to the lifting apparatus the spreader is remotely actuated by non-load bearing connections, which connections are protected from inadvertent separation or severance. This protection is afforded by an interlock attached to the coupling and integrated with the lift apparatus that restricts movement of the hoist block when the pin is retracted and restores hoist movement upon manual separation of these non-load bearing connections.

---

This invention relates to the art of handling cargo containers during loading or unloading thereof, and more particularly, to a quickly acting connector system for coupling a container engaging spreader frame to a hoist block.

Cargo articles or containers are presently remotely handled by means of automated cranes or other lifting apparatus. Such cranes are automated by having spreader frames attached thereto, which frames are equipped to attach remotely to cargo containers being handled.

This remote attachment is accomplished by lowering the spreader frame to immediately overlie the cargo container being handled. In this overlying relationship, attachment lugs on the spreader frame penetrate into engaging sockets on the container. When these attachment lugs are in such a penetrating position, they are remotely actuated, typically by rotation, and firmly attached to the sockets thereby accomplishing the desired remote engagement of the container.

This remote engagement, however, is dependent upon the spreader and cargo container having attachment lugs and sockets in complementary spatial relationship. This complementary spatial relationship is maintained by equipping containers of the same size with equivalent and equal spacing between their attachment sockets.

Unfortunately, cargo articles and containers come in differing sizes. Containers of each differing size typically have their sockets in differing spatial relationship and therefore require spreaders with attachment members in differing spaced relation. As a single rigid spreader frame is not capable of accommodating differently spaced sockets, it is necessary to interchange such spreader frames when the same lifting apparatus is used to handle containers of differing sizes. This desired spreader change, however, has in the past required considerable disassembly and rerigging of the automated cranes.

Such rerigging and disassembly has in the past been due to the fact that spreaders have been directly reeved by cables and sheaves to the lifting apparatus. This direct reeved connection has required time consuming disassembly of the hoist block or spreader for the required spreader interchange. To prevent such a time consuming and laborious interchange, the present invention provides an apparatus for quickly and securely coupling and uncoupling different automated spreader frames to a single cargo crane.

Accordingly, the disclosed invention adapts a crane to handle sequentially differently sized cargo containers through a coupling for rapid spreader frame interchange. This coupling interconnects a hoist block attached to the lifting end of a crane with a selected spreader designed to handle cargo articles or containers of specific dimension.

The coupling comprises at least two complementary attachment members affixed to the hoist block and spreader respectively. These attachment members have opposing surfaces and are configured for slidable and gathering engagement along such surfaces from positions of the hoist block immediately overlying the spreader. This slidable and gathering engagement takes place when the hoist block is lowered relative to the spreader and continues until the attachment members reach a position of registry. When the attachment members are in this position of registry, the connection between the hoist block and spreader is completed by an interconnecting pin mounted for reciprocal movement to one of the attachment members. This pin moves reciprocally to its accommodating attachment member and penetrates an aperture defined in the other registered and complementary attachment member, thus permitting rapid spreader interchange through sequential manipulation of the hoist block and pin.

This reciprocally mounted pin has the advantage of being movable by an attached lever. This lever, as attached to the pin, simultaneously provides the required leverage to move the relatively heavy interconnecting pin as well as an apparatus capable of restricting the pin in the coupled or uncoupled disposition, respectively.

The interconnecting pins must be of high strength to withstand the entire load of the spreader and the container engaged by the spreader. Such high strength is achieved by making the pin massive and heavy. The present invention includes a lever arrangement for effecting controlled reciprocating movement of the relatively heavy pin. The medial portion of the lever is mounted to the pin by a shaft so as to afford pivotal movement between the pin and the lever. One end of the lever is hingably affixed to the attachment member that accommodates the reciprocating pin. The opposite end of the lever is provided with a handle for manipulation. This handle can be grasped to swing hingably the lever about the attachment member at one end and reciprocally move the pivotally attached pin, thus providing leverage for moving this relatively heavy interconnecting member.

The hingably attached lever has the further advantage of securing against inadvertent dislodgment the coupling pin in the coupled or engaged penetrating position. This lever is biased laterally by a spring, which spring in the present disclosure is located at the pivotal connection between the pin and the lever. As biased, the lever moves laterally of its hingable mounting to the attachment member into engagement with catch member. This catch member is affixed to that attachment member accommodating the pin and is positioned relative to such member so as to engage cooperatively the lever when the pin is in the penetrating position. This cooperative engagement between the lever and catch member is maintained by the bias of the spring and thereby firmly holds and maintains the pin in its coupled or engaged penetrating position.

The lever is provided with members for locking the interconnecting pin in the uncoupled or retracted disposition which disposition is necessary to permit unobstructed slideable engagement of the complementary attachment members during spreader interchange. To maintain the pin retracted during such interchange, the knee hinge members interconnect the hingeably attached lever and, attachment member accommodating the lever. These knee hinge members fold to an open position when the lever and attached pin are moved from their coupled position to their uncoupled position; the knee hinge members lock in a knee-joint disposition when the lever fully retracts the pin. As locked, the knee-hinge members oppose forces from gravity acting on the lever tending to return the pin to the interconnecting disposition. These interlocking hinge members only release the lever from its retracted disposition when the knee locking disposition of such members is manually overcome by a force applied to at least one of the knee members.

As equipped with this interlocking lever, the interconnecting coupling has the advantage of permitting rapid spreader interchange without manual positioning of the part to be coupled or handling of the interconnecting members.

Regarding such manual positioning and handling, connection of a hoist block to any object to be lifted, as for example a spreader, is normally accomplished by the operator of the lift apparatus positioning the hoist block in the vicinity of the object. Thereafter, the hoist block and object are manually positioned into registry with one another. In such a position of registry, interconnecting members joining the object and hoist block are manually inserted. Such manual positioning and inserting requires time and labor, and further is a source of industrial accidents.

The coupling of the present invention avoids such manual positioning by providing a gathering engagement between the complementary attachment members. This gathering engagement permits the hoist block to be positioned relative to the spreader remotely, even though such remote positioning produces inevitable deviations from positions of exact registry. These deviations from positions of exact registry are removed and compensated by the gathering and slidable engagement provided between the complementary attachment members. This gathering and slidable engagement permits a remote registry between the coupled attachment members. When the complementary attachment members are thus registered, the interconnecting pin can be remotely reciprocated by the lever thereby effecting coupling without direct manual handling of this interconnecting member.

The disclosed crane coupling has thus far been described as a load bearing juncture between the hoist block and selected spreader. Such couplings, however, must also be adapted to transmit actuating signals between the control station of the lift apparatus and attached spreaders for controllably moving the attachment lugs into and out of connection with the cargo containers.

Spreaders, such as those used for the present invention, are commonly remotely actuated from a control station on the lifting apparatus via actuating connectors or control cables. These control cables in extending between the control station and the spreader have that section between the hoist block and spreader provided with a disconnecting plug or connector. This connector enables the electrical disconnection between the spreader frame and hoist block whenever the spreaders are interchanged. Unfortunately, when the coupling mechanism or apparatus is in the disengaged position and the plug or connector is in the engaged position, inadvertent movement of the hoist block with respect to the spreader will sever or otherwise destroy such an actuating connection.

Accordingly, the present invention discloses an integrated lift apparatus interlock circuit which prevents or inhibits hoist block movement when the connector or plug is connected without the coupling being in the engaged position. This circuit comprises a mechanism, such as a limit switch, sensing the open or disengaged position of the coupling pin interconnecting the spreader and hoist block. This sensor interrupts the control of the hoist block from the control station of the lift apparatus when the coupling is in the disengaged disposition. When, however, the plug or connector is disengaged, completing the severance of the hoist block and spreader, movement of the lift apparatus is restored, typically by means of a normally closed relay across the limit switch. This relay, maintained in the open position when the actuating connectors or plugs are communicated, is thrown to the closed position upon disconnection or manual separation of the connection, thereby restoring movement of the crane or lift apparatus.

Other objects, features and advantages of the present invention will be more apparent after referring to the following specification and attached drawings in which:

FIG. 1 is a front elevation view of a hoist block and spreader having paired attachment members in the engaged position;

FIG. 2 is a side elevation view of FIG. 1;

FIG. 3 is an enlarged side elevation view of a hoist block showing the lever for reciprocally moving the interconnecting pin;

FIG. 4 is a plan section taken along line 4—4 of FIG. 3 illustrating one end of the hoist block in the vicinity of the sheaves, which sheaves are removed for clarity;

FIG. 5 is a side elevation view of the spreader attachment member;

FIG. 6 is a front elevation section of the spreader attachment member taken along the line 6—6 of FIG. 5;

FIG. 7 is a side elevation section of FIG. 3 at line 7—7 showing the hoist block attachment member with its reciprocating coupling pin in the retracted position;

FIG. 8 is a side elevation section similar to FIG. 7 showing specifically the coupling pin in the engaged position;

FIG. 9 is an enlarged side elevation view of the knee-hinged members restricting the lever and attached pin to the uncoupled disposition and illustrating in the phantom view the closed disposition of the knee-hinged members;

FIG. 10 is an enlarged side elevation section of the coupling pin showing the pivotal attachment of the lever to the pin and spring biasing such attachment for urging the lever into a locked engagement on the attachment member;

FIG. 11 is an enlarged plan section detail of FIG. 8 at line 11—11 showing in particular the locking engagement of the lever with the catch member as affixed to the attachment member;

FIG. 12 is a side elevation section of the coupling pin in the engaged position showing specifically the actuation by the coupling pin of a limit switch, which limit switch interrupts the hoist control; and FIG. 13 is a schematic representation of the circuitry attached to the hoist control permitting interruption of the hoist control circuit upon retraction of the coupling pin and restoration of the hoist control circuit upon manual uncoupling of the plug connecting the actuating circuits of the spreader with the lifting apparatus.

With specific reference to FIGS. 1 and 2, a lifting apparatus hoist block A is shown operably coupled to spreader B by paired couplings C and actuating interconnections D. Couplings C comprise complementary attachment members 22 and 86. These attachment members extends towards one another from hoist block A and spreader B, respectively, into the joined and coupled position illustrated. Actuating interconnections D comprise cables 20 and 30, which cables communicate actuating signals from the control station of the lift apparatus (not shown) to the spreader B. Operation of the coupled hoist block and spreader can be be understood by briefly describing the hoist block and spreader, and thereafter, setting forth the operations of the mechanisms as joined.

With regard to hoist block A, this mechanism is mechanically attached to a crane or like lifting apparatus (not shown). This mechanical attachment or interconnection is accomplished by cables 17, which cables are reeved about sheaves 14. Each pair of sheaves 14 is rotatably attached and contained within sheave housings 16 (see FIG. 3) at either end of hoist block A.

In addition to the mechanical interconnection of hoist block A to the lift apparatus, an actuating connection must be provided. This actuating connection communicates the control station of the lift apparatus with the hoist block providing a path whereby actuating signals for the spreader can be communicated. This path is provided by an actuating conduit or electrical cable 20. As is apparent, the actuating connection of cable 20 must be maintained at all times while hoist block A is raised and lowered relative to the lift apparatus.

To maintain this actuating connection during such raising and lowering, there is attached to hoist block A medially of hoist block frame 15 a tub 19 for containing the conduit or cable 20. As hoist block A is raised, flexible conduit 20 is gathered or accumulated in tub 19; as the hoist block is lowered, the conduit is retracted from the tub thus maintaining the required actuating connection between the lift apparatus and hoist block A at all times.

Hoist block A comprises a rigid frame 15. Frame 15 is formed by sheave housings 16 at either end thereof with two frame side members 18a and 18b interconnecting the housings in predetermined spatial relation at either side thereof. Housings 16 each have depending therefrom attachment members 22, which members at either end of the hoist block form the mechanical interconnection of coupling C to spreader B.

Referring now to spreader B, this apparatus has spreader frame 24, which frame is typically coextensive with the top portion of the particular cargo article or container being handled. Similar to frame 15 of hoist block, spreader B has a rectangular frame 24. Frame 24 comprises cross members 88 at either end thereof with side members 89 forming the elongate rectangular sides. Medially of cross members 88 and extending upwardly therefrom are spreader attachment members 86, which members when joined with attachment members 22 from hoist block A form the mechanical interconnection of coupling C between hoist block A and spreader B.

Spreader B is equipped for automated attachment to cargo containers. This attachment is accomplished by attachment lugs 26 located at each corner of rigid spreader frame 24. Lugs 26 are each configurated for cooperative grasping engagement with mating sockets (not shown) attached to the cargo containers being handled. In accomplishing such interconnection or attachment, lugs 26 first penetrate these attachment sockets on the respective container and thereafter remotely rotate effecting firm attachment. The remote rotation of lugs 26 is accomplished by an actuating apparatus 28. This apparatus simultaneously rotates each of the four attachment lugs 26 upon remote signal from the control station of the lifting apparatus.

Regarding this remote rotation of lugs 26 by lugs actuating apparatus 28, it is necessary that actuating interconnection D be provided across the coupled hoist block A and spreader B. These actuating interconnections comprise an electrical cable or actuating conduit 30 connected to cable 20 within tub 19. This connection of cables 20 and 30 takes place at plug 32, which plug comprises a mating electrical connection for the electrical conductors contained within the respective cables 20 and 30.

As operably coupled, both mechanically and electrically, spreader B can remotely attach to containers. In such remote attachment, the spreader B is positioned by the crane directly overlying a container. The spreader is then lowered to contact container with attachment lugs 26 on the corners of spreader frame 24 penetrating mating sockets in the cargo being handled. Thereafter, the operator of the lifting apparatus will communicate an actuating signal to spreader B. This actuating signal will travel through conduits 20 and 30. Upon receiving an actuating signal, lug actuating apparatus 28 rotate plugs 26 in unison so as to interconnect the cargo article with the spreader through mating engagement between the lugs and sockets attached to the spreader and container respectively. After such interconnection, hoist block A with attached spreader B and the engaged container will be moved or manipulated to a second position. In such position, the crane operator will communicate a second signal to actuating apparatus 28 moving attachment lugs 26 so as to disengage and release the cargo container.

Having set forth the operation of the coupled hoist block and spreader, interconnecting coupling C can now be described in detail. Coupling C is here illustrated comprising four complementary attachment members. Two spreader attachment members 22 are affixed at either end of hoist block A and likewise two attachment members 86 are attached at either end of spreader B. As attached to the hoist block and spreader, attachment members 22 and 86 are mounted in complementary spatial relationship.

This spatial relation permits each upwardly extending spreader attachment member 86 to oppose each downwardly extending hoist block attachment member 22 and enables simultaneous slidable engagement of such complementary members at either end of the hoist block and spreader. This complementary slidable engagement will become apparent upon a detailed description of one of each of the hoist block and spreader attachment members, respectively.

With specific reference to FIGS. 3, 4, 7 and 8, one of the paired hoist block attachment members is specifically illustrated, the other member being identical. Attachment member 22 is shown extending downwardly from sheave housing 16. Each housing 16 comprises two housing side plates 34 held in spaced-apart relation on either side of sheaves 14. This spaced-apart relation is maintained by housing end plates 35 and spacing shaft 38. Housing end plates 35 are affixed between side plates 34 at the lower, arcuate and outward portion thereof. Spacing shaft 38 penetrates the housing side plates 34 medially and is affixed to the side plates at this juncture so as rigidly to maintain their spaced-apart relation. The separated side plates 34 are cross-bored with paired apertures to effect rotatable attachment of paired sheaves 14 by sheave axles 37. These same side plates 34 are the portions of housing 16 to which the attachment member 22 is affixed.

Attachment member 22 has spaced-apart tapered members 40, tapering in a wedge-like configuration downwardly from either side of sheave housing 16. Tapered members 40 comprise exposed plates 40a and 40b, side flange members 41 and opposed coupling plates 42a and 42b. These latter opposed coupling plates form the opposing surfaces between which the slidable engagement of the complementary spreader attachment member 86 takes place.

Referring specifically to FIGS. 7 and 8, these opposing coupling plates 42a and 42b are shown welded to the inward opposing side medial portions of housing side plates 34. As attached plates 42a and 42b extend downwardly from each side of sheave housing 16, the length of tapered members 40 terminating at outwardly and angularly extending gathering sections 43. Attached to the tapering sides of opposed coupling plates 42a and 42b are flange members 41. These flange members attach to the outside of coupling plates 42a and 42b and extend the length of the tapered members 40 from the bottom portion of opposed coupling plate 42 up to sheave housing 16. Attachment flanges 41 have their sides opposite coupling plates 42a and 42b attached to covering plates 40a and 40b. These covering plates have the same shape as the coupling plates 42a and 42b and make tapered members 40 a hollow and enclosed body.

The attachment member 22, formed by paired tapered members 40 has a reciprocating pin 45 mounted thereto, which pin comprises the interconnecting member of coupling C. Pin 45 fits through coupling aperture 46 in coupling plate 42a and extends slidably and reciprocally therethrough into pin sleeve 48. Pin sleeve 48 is attached to coupling plate 42a and guide pin 45 so as to center the pin when it is reciprocated towards coupling plate 42b. As centered the reciprocating pin extends between paired tapered members 40 and penetrates a second coupling plate aperture 49 in plate 42b. This second coupling plate aperture 49 in cooperation with first coupling plate aperture 46 forms the complementary structure which makes the interconnecting pin an efficient load transmitting member.

Pin 45 is reciprocated by a lever 52. This lever is attached to the back side of coupling plate 42a and is exposed through lever slot 50 and cover plate 40a which lever slot makes possible the outward rotation of the lever for reciprocating actuation of the pin.

Lever 52 is made from a U-shaped channel. This channel is hinged at the top portion thereof to the back side of coupling plate 42a. As hinged, lever 52 can be moved arcuately outward by means of handle 55.

The interconnection between the lever 52 and the reciprocating pin 45 is effected by pin pivot 59. Pin pivot 59 comprises a pivot axle 60, which axle penetrates the pin at an end removed from the penetration of pin 45 between tapered members 40. This penetration is through a transverse pivot aperture 62, which aperture accommodates pivot axle 60 axially therethrough.

In addition to providing for the manipulation of reciprocating pin 45, lever 52 comprises a portion of an interlocking mechanism capable of maintaining the pin in the retracted position. This interlocking of the pin permits paired attachment members 22 of hoist block A to be slidably engaged with the complementary attachment members without interference from pin 45.

Locking of pin 45 in the retracted position is caused by knee hinge members 65. These knee hinge members 65 are specifically illustrated in the detail of FIG. 9 and are shown extending between the back side of coupling plate 42a and lever 52. Members 65 comprise a first knee member 69 and a second knee member 71, both members being pivotally attached to one another at one end by a connection shaft 70. First knee hinge member 69 attaches at the end removed from connection shaft 70 to knee pivot member 67 on the back side of coupling plate 42a. This pivotal connection is completed by coupling plate connection shaft 68. Likewise second knee hinge member 71 attaches to lever connection shaft 72 mounted to lever 52. Shaft 72 attaches to the side channel portions of lever 52 and penetrates the medial portion of second knee hinge member 71 therebetween. The end portion of second knee hinge member 71 removed from connection shaft 70 comprises actuating finger 73. This finger protrudes through an aperture 75 in lever 52 at a disposition where it may be manually actuated to disengage the knee hinge lock of members 65.

To maintain the knee hinge lock of members 65, there is attached to the back side of coupling plate 42a an inclined knee restriction plate 77. Restriction plate 77 extends outwardly from coupling plate 42a at an angle slightly downward from horizontal so as to restrict pivotal movement of the knee hinge member to a locking position slightly over center. At such locking position, pin 45 is maintained in a retracted position.

The operation of knee hinge members 65 can be understood by assuming that lever 52 is parallel to coupling plate 42a and interior of lever slot 50. In such position knee hinge members 65 fold upwardly at connection shaft 70 into that position specifically illustrated in broken lines in FIG. 9. In this folded position, first knee member 69 extends angularly upwardly at an acute angle from the reverse side of coupling plate 42a while second knee member 71 forms an acute angle to first knee member 69 about connection shaft 70. This folding permits lever 52 to immediately overlie the reverse side of coupling plate 42a.

The interlock of the knee hinge members takes place when lever 52 is moved angularly away from coupling plate 42a about hinge 54 to the position shown in FIG. 7. In such movement the distance between coupling plate connection shaft 68 and lever connection shaft 72 will increase. This increasing distance will cause first knee hinge members 69 to pivot about coupling plate connection shaft 68 in an arc while second knee hinge member 71 pivots in a complementary arc about lever connection shaft 72. The pivotal movement of both members 69 and 71 will continue until connection shaft 70 reaches a position along an imaginary straight line interconnecting the axis of coupling plate connection shaft 68 and lever connection shaft 72.

When the knee hinge members 65 have reached this extended position, lever 52 will be released and will be gravitationally urged to pivot about hinge 54 toward its original position adjacent and parallel to the back side of coupling plate 42a. The forces of gravity, however, acting upon knee hinge members 65 in the vicinity of connection shaft 70 will not permit the knee hinge members to return to their original upwardly folding position. Instead members 65 as gravitationally urged in the vicinity of connection shaft 70 will tend to rotate downwardly until first knee hinge members 69 comes into contact with knee restriction plate 77. When first knee hinge member 69 is resting against knee restriction plate 77, connection shaft 70 will lie below an imaginary straight line between the axis of coupling plate connection shaft 68 and lever connection shaft 72. When connection shaft 70 is below this straight line, all forces applied on lever 52 will be transmitted through the extended knee hinge members urging first knee hinge member 69 against knee restriction plate 77. As this plate 77 will prevent further downward rotation of knee hinge members 65, these members will maintain a locked spatial interval between the coupling plate and lever accomplishing the desired interlock, thereby maintaining the pin in a retracted position.

When it is desired to overcome this interlock and to return lever 52 to its inward position, lever 52 will be moved outwardly by application of force to handle 55. At the same time lever 52 is moved outwardly, actuating finger 73 on second knee hinge member 71 will be rotated downwardly by manipulation. This manipulation will cause connection shaft 70 to rotate upwardly about lever connection shaft 72. This upward rotation of connection shaft 70 will fold the knee hinge members 65 into the original upward position as lever 52 is released. This folding will permit lever 52 to return to its position parallel and adjacent to the back side of coupling plate 42a, which return will move attached interconnecting pin 45 to the coupled position.

Knee hinge members 65 serve the additional function of restricting the pivotal movement of lever 52 with respect to attachment members 22 and thereby maintain coupling pin 45 interior of sleeve 48. If lever 52 is rotated outwardly from coupling plate 42a by handle 55, knee hinge members 65 will permit such movement until members 69 and 71 are fully extended. In such an extended position they will limit the movement of lever 52, thereby preventing pin 45 from being retracted from its slidable engagement with pin sleeve 48.

In addition to the previously described interlock of the pin and lever in the open or retracted position, it is also necessary to firmly lock pin 45 in the coupled disposition. This coupled interlock of pin 45 is necessary to prevent inadvertent dislodgment of the coupled hoist block and spreader due to the pin working during handling of the spreader.

This coupled interlock of pin 45 in the closed position is provided through lever 52. Lever 52 has acting thereon a spring bias at the medial portion thereof urging the lever to pivot about hinge 54 parallel to the surface of coupling plate 42a. Opposing this bias is a catch member 82 acting on the lever proximate handle 55.

Referring specifically to the detail of FIG. 10, the structure for biasing of lever 52 at pin 45 is illustrated. Pin 45, shown in section, has a pivot aperture 62 therein for accommodating a pivot axle 60 extending therethrough. Aperture 62 has an enlarged coaxial spring bore 79 extending approximately half way through the diametrical section of pin 45. This spring bore 79 accommodates a biasing spring 80, which spring is under compression between the medial portion of pivotally attached pin 45 and the side channel of lever 52. As is apparent, this spring will urge lever 52 normally with respect to the reciprocating movement of pin 45. As urged, the lever will pivot about hinge member 54 at the top portion thereof and will urge lever 52 at the bottom portion thereof in a path parallel to coupling plate 42a.

As shown in FIGS. 7 and 8, and more specifically in the detail of FIG. 11, the movement of lever 52 as biased is opposed by a catch member 82. This catch member is attached to the back side of coupling plate 42a and is configured for opposing mating engagement with catch aperture 83 in the bottom portion of the side channel of lever 52.

The cooperative engagement of the spring bias and catch apertures may now be described. When lever 52 is moved from the outwardly extended position to a position parallel with the backside of coupling plate 42a, the side channel of lever 52 will move into contact with catch member 82. This contact of lever 52 will first occur at catch member taper 84. As lever 52 moves to a position parallel to coupling plate 42a, taper 84 will move lever 52 parallel to plate 42a away from catch member 82. This sideways pivotal movement of the lever about hinge 54 will oppose the bias of spring 80 so that when catch aperture 83 is in registry with catch member 82, lever 52 will spring back towards catch member 82 and a cooperative interlock between the aperture and member will occur. Once lever 52 is in this interlocked position inadvertent retraction or working of pin 45 will be prevented.

When outward rotation of lever 52 is desired, lever handle 55 will be moved parallel to coupling plate 42a in opposition to the bias of spring 80. Such movement is continued until catch member 82 and catch aperture 83 are out of registry. Once these members are out of registry, lever 52 can then be rotated angularly outward with respect to attachment member 22 to disengage pin 45.

Having illustrated one attachment member 22 the complementary spreader attachment member 86 may now be described.

With specific reference to FIGS. 1 and 2, spreader attachment members 86 are shown attached to each end of spreader B. These members 86 extend upwardly at both ends of the rectangular spreader frame 24 from the medial portion of the two frame cross members 88 at either end.

Referring now to FIGS. 5 and 6, one of the two spreader attachment members 86 is specifically illustrated, the other attachment member being identical. As can be seen, attachment member 86 has a central channel member 91 attached medially to cross member 88 and extending upwardly therefrom. On either end of central channel member 91, there are two web members 92. Web members 92 are attached medially to the side portion of central channel member 91 so as to form the ends of an I-cross section. As attached, web members 92 extend from the top portion of the central channel member to the top of frame 24 where they fasten to cross member 88 as at 88a.

Attachment member 86, as affixed to spreader frame B, has two major functions. First, the attachment member must accommodate interconnecting pin 45 so as to permit coupling of the hoist block to the spreader. Second, attachment member 86 must accommodate the slidable and gripping engagement of the complementary hoist block attachment member 22 to a position of registry between the interconnecting pin 45 and attachment member 86. The structure accomplishing these functions on attachment member 86 will now be described.

Regarding attachment member 86 accommodating interconnecting pin 45 therethrough so as to effect attachment between the hoist block and spreader, a pin aperture 99 is configured therethrough at the top of the attachment member 86. This top portion of member 86 comprises paired gusset plates 94 on either side of central channel member 91. Medially located through the gusset plates and penetrating channel member 91 is pin aperture 99. Aperture 99 has a diameter sufficient to accommodate the penetrating engagement of pin 45, and because of the combined strength of gusset plates 94 and central channel member 91, the material at the periphery of the aperture is capable of sustaining the load transmitted through the interconnecting pin 45.

In addition to accommodating interconnecting pin 45, attachment member 86 must be configured for cooperative gathering and slidable engagement with hoist block attachment member 22. Accordingly, at the top portion of each web member 92 there are affixed gathering blocks 98. Each block 98 has a tapering surface 96 which tapering surface extends from the inner lower portion of blocks 98 outwardly and upwardly towards the top of attachment members 86. These tapering surfaces are used to effect the initial gathering attachment of hoist block attachment member 22 parallel to central channel member 91 during its initial cooperative penetration of spreader attachment member 86.

Complementing the gathering function of block 98 are gusset plate tapers 95 configured in gusset plates 94. These tapers 95 begin at the topmost portion of gusset plate 94 and extend downwardly and outwardly of central channel member 91 to a coupling surface 97. This coupling surface 97 is defined by the exposed surface portion of gusset plate 94 which surface faces outwardly. Tapers 95 effect a gathering attachment of the hoist block attachment members in a direction normal to the face of central channel member 91.

The gathering engagement of hoist block attachment member 22 with spreader attachment member 86 is continued at the medial portion of the spreader attachment member. Regarding such gathering engagement, on either side of spreader attachment member 86 there are attached centering plates 100. Plates 100 are attached to the sides of web members 92 and extend across these members from the lower two thirds of the attachment member down to both sides of cross members 88 of spreader frame 24. These centering plates are cut away at the upward portion thereof so as to have configured therein upwardly diverging gathering tapers 101.

Tapers 101 extend from the upward cut-away portion of plates 100 down to the medial portion of the plate and define a wedge-shaped aperture in the plate, which aperture gathers the wedge-shaped tapered members 40 on hoist block attachment member 22 (see FIG. 3).

The gathering engagement between hoist block attachment member 22 and spreader attachment member 86 is completed by a registering pin 103 attached to the spreader and a registering groove 109 attached to the hoist block.

Registering pin 103 is affixed to central channel member 91 next to the bottom portion of gathering tapers 101. Pin 103 extends through and is affixed to central channel member 91 at registering pin aperture 104. The pin affixed at the medial portion thereof to aperture 104 protrudes from the face of central channel member 91 on both sides thereof. Pin 103 is reinforced on both sides of the central channel member by reinforcement plates 106. These plates each form a right triangle, one side of which attaches to the protruding portion of pin 103 axially along the bottom portion thereof and the other right leg of which is affixed to central channel member 91. These plates reinforce the pin 103 to enable the pin to withstand forces imposed as it registers with the registering groove 109 in hoist block attachment member 22.

Referring again to FIGS. 2 and 3, registering groove 109 appears at the bottom portion of hoist block attachment member 22. Groove 109 is located in the central bottom portion of each coupling plate 42a and 42b. As shown in FIG. 3, this groove has downwardly diverging gathering arcs 111 opening at the bottom portion thereof. These arcs engage registering pin 103 and guide it upwardly and centrally to the top portion of groove 109. This top portion of groove 109 in its contact with pin 103 is in turn reinforced by groove gusset plates 112. These plates fasten to the outward side of coupling plates 42a and 42b respectively and serve to prevent pin 103 from deforming the registering groove 109 during abrupt contact of the hoist block and spreader.

In addition to the gathering engagement between the hoist block and spreader through their respective attachment members 22 and 86, a slidable engagement of these members takes place. It will be remembered with reference to FIGS. 7 and 8 that affixed to either side of sheave housing 16 are tapered members 40, which members define opposing surfaces between their respective coupling plates 42a and 42b. These plates are mounted in parallel spatial relation so as to define therebetween inwardly opposing surfaces. These opposing surfaces are slidably engaged on either side of central channel member 91. This slidable engagement takes place along surfaces 97 defined by the exposed portion of gusset plates 94 at the top portion of the member and at the bottom portion of the member along surfaces 97a defined by registering plates 105 on either side of pin 103.

Having set forth the structures of both complementary attachment members 22 and 86, the slidable engagement of the hoist block and spreader through coupling B may now be described.

In effecting such attachment, the hoist block will be positioned to overlie the selected spreader B with the attachment members 22 at either end of the hoist block overlying the attachment members 86 at either end of the spreader. Lever 52 and pin 45 on each attachment member 22 will be moved to the retracted positions. In such a position, knee hinge members 65 will restrict the lever and pin from penetrating the space between the opposed coupling plates 42a and 42b. Once the hoist block is so positioned, the lift apparatus will be remotely lowered with the protruding attachment member 22 at each end of the hoist block penetrating into cooperative engagement with the upwardly extending spreader attachment members 86.

This gathering and slidable engagement will first occur when coupling plates 42a and 42b of hoist block attachment member 22 engage the spreader attachment members 86 by passing on either side of central channel member 91 between flange members 92. Plates 42a and 42b will be centered or aligned normal to central channel member 91 by gathering sections 43, which sections will contact gusset plates 94 at gusset tapers 95. Alignment parallel to central member 91 will initially be achieved by channel sides 41 contacting gathering blocks 98 at the top portion of attachment member 86 on spreader B. Tapered surface 96 on each gathering block will guide hoist block attachment members 22 centrally of channel member 91 thereby initiating the mating engagement of the respective attachment members.

As the lowering of hoist block A relative to spreader B continues, coupling plates 42a and 42b will slidably engage outward coupling surface 97 of gusset plates 94. The separation between coupling surfaces 97 on either side of central channel member 91 is of a thickness which defines a mating and slidable engagement between the opposed coupling plates 42a and 42b. As hoist block attachment members 20 at either end of hoist block A further descend on each spreader attachment member 86, channel sides 41 of each tapered channel member 40 will engage the gathering taper 101 of centering plates 100 in a cooperative wedging engagement. This wedging engagement will center and register hoist block attachment members 22 with respect to spreader attachment members 86.

When the hoist block A reaches the lower limit so as to engage fully attachment members 22 with the spreader attachment members 86, registering groove 109 on hoist block attachment member 22 will encounter registering pin 103 on spreader attachment member 86. This contact will take place at gathering arcs 111 and thereafter pin 103 will be centered interior of the registering groove 109. When registering pin 103 reaches the end of groove 109, the slidable engagement of the complementary attachment members will cease.

It will be noted that the bottom portion of opposed coupling plates 42a and 42b slide directly over the exposed surface 97a of registering plates 105. Similar to the engagement of plates 42a and 42b with gusset plates 94, the coupling surface 97a on registering plates 105 defines an area of slidable engagement between the opposed plates 42a and 42b on hoist block attachment member 22 and the spreader attachment member 86.

Typically, the operator of the lifting apparatus will lower cables 17 reeved to hoist block A so that the cables are slack. Thereafter lever 52 will be manipulated by means of handle 55 as previously described to advance pin 45 through pin aperture 99 in spreader attachment member 86 and into coupling plate aperture 49 in coupling plate 42b. Lever 52 will then be locked by the engagement between catch member 82 and catch aperture 83.

When it is desired to uncouple spreader B from hoist block A, the lift apparatus operator will lower hoist block A and the coupled spreader B until cables 17 are slack. Handle 55 and lever 52 will be manipulated so as to unlock catch member 82 with catch aperture 83, and the lever will be rotated outwardly about lever hinge 54. Pin 45, as pivotally attached to the lever, will be retracted and locked by means of knee hinge members 65 in the retracted position. The hoist block may then be freely disengaged by slidable disengagement of hoist block attachment members 40 from spreader attachment members 86.

Having set forth the mechanical engagement and disengagement of coupling C, the actuating interconnection extending across the hoist block and spreader may be easily understood. With reference to FIG. 1, it will be remembered that actuating signals were communicated from the control station of the lift apparatus to the spreader. These signals remotely actuated the automated spreader to attach or release containers. As set forth in the present disclosure, this signal traverses a path across the couplings C by means of cables 20 and 30, which cables are in turn joined by means of plug 32. As is apparent, when plug 32 is connected, the coupled spreader and hoist block are operable; when the plug is separated, the hoist block and spreader may be mechanically disengaged.

Unfortunately, the expedient of connecting and disconnecting plug 32 during such spreader interchange is complicated by the possibility that separation may be attempted while the plug remains in the coupled or engaged position. Such inadvertent lifting could sever and destroy the interconnection of the actuating conduit or cable 20 or 30. As these cables contain numerous electrical conductors for communicating various spreader interlocks to the hoist control, such inadvertent severing could be extremely difficult to repair and further, could cause spreader malfunction with resultant damage to the cargo or crane.

To prevent such inadvertent severance, hoist interlock E is integrated with actuating interconnections D so as to prevent hoist movement when plug 32 is engaged and couplings C are disengaged.

With specific reference to FIG. 13, a hoist interlock E is specifically illustrated. Operation of this interlock may best be understood by setting forth briefly the description of how the lift apparatus is actuated and thereafter, setting forth the circuitry interconnecting the hoist block and spreader, which circuitry appropriately inhibits the hoist to prevent severance of actuating interconnections D.

The lifting apparatus typically has an electrical power supply 120, which power supply furnishes the power necessary to drive the hoist mechanism 124. Intervening between the power supply and hoist mechanism there is provided a hoist motor control 122. Motor control 122 distributes power to the hoist mechanism for the raising, lowering or transporting of the hoist block with attached spreader. These motions of the hoist mechanism are in turn controlled by an operator at hoist control station 126. Hoist interlock E shown in FIG. 13 functions to electrically disrupt the power between power supply 120 and hoist motor control 122, thereby selectively inhibiting the lifting apparatus.

In order to accomplish this inhibiting, hoist interlock E must be provided with a sensor capable of detecting when coupling C is in the open or disengaged position. With specific reference to FIGS. 7, 8 and 12 this sensor in the form of normally open limit switch 132, is illustrated in detail.

Limit switch 132 is attached to the backside of coupling plate 42b immediately over coupling plate aperture 49. This switch 132 has attached thereto an actuating lever 133. Lever 133 extends into and partially through coupling aperture 49. As shown in FIG. 7, when pin 45 is in the retracted position, actuating lever 133 penetrates interior of coupling plate aperture 49. If, however, pin 45 is moved to the interconnecting disposition, actuating lever 133 will be rotated out of penetration interior of pin aperture 49. Such rotation will move mechanism interior of limit switch 132 to close a set of normally open contacts therein. Such contacts form a part of hoist control circuit E.

Referring again to FIG. 13, the interruption of the hoist mechanism provided by hoist control circuit E may now be understood. Power from power supply 120 is connected to motor control 122 through normally open contacts 127 of a relay that includes a coil 127a. Coil switch 127a is actuated electrically from a power source 128. When electrical power is provided to coil 127a, power will flow from the power supply 120 to the hoist motor control 122 through contacts 127, thereby enabling operation of the hoist mechanism.

Alternately, when power is disrupted between power supply 128 and relay coil 127a, contacts 127 open so that power to the hoist motor control is interrupted, preventing operation of the hoist mechanism. By adapting limit switches 132 selectively to open and close power switch 127, the actuating interconnection of plug 32 is protected.

Limit switches 132 are of the normally open variety. These switches are connected series between power supply 128 and power switch 127. As is apparent from the schematic diagram, an interruption of the series circuit would occur whenever either switch 132, attached to the respective hoist block attachment member 22, is in the open position. Such switch position will occur when either interconnecting pins 45 is in the retracted position.

When the circuit between the hoist control and motor control have been thus interrupted, hoist mechanism 124 will cease to operate for lack of power. This stoppage of operation while protecting inadvertent separation of the actuating conduits 20 and 30 will prevent the slidable disengagement of the hoist block attachment members 22 with respect to the spreader. It is therefore necessary to restore power to the hoist motor control upon separation of the actuating interconnections D extending between the hoist block A and spreader B.

This restoration upon manual disconnection of plug 32 is provided by normally closed relay contacts 135 which are operatively associated with a relay coil 135a. This relay is in turn actuated to the open position by a circuit that includes coil 135a, an energy source 137, and an actuating loop 139. This actuating loop 139 is shown partially enclosed within broken lines 129 in the schematic diagram. The portion so enclosed is completed across plug 32.

When loop 139 is completed, current flows to relay coil 135a. As can be seen, if plug 32 is disengaged, actuating loop 139 will be interrupted, opening the circuit to coil 135a. With this interruption, normally closed relay contacts 135 will return to the closed position, bypassing limit switches 132 and restoring power to power switch 127. Relay coil 127a, upon receiving actuating energy from power supply 128, will close contacts 127 so as to restore power flowing between the power supply and hoist motor control, thereby permitting operation of the hoist mechanism.

In operation, hoist control circuit E will function to close or interrupt the operation of the lift apparatus when either of the interconnecting pins 45 is moved to the retracted or uncoupled position. The operating crew after effecting disengagement of either of the paired couplings C will be required to disconnect plug 32 before hoist block A can be moved relative to spreader B. The disconnection of plug 32 will open loop 139 and return normally closed relay 135 to the closed position, bypassing the interruption of limit switches 132 and restoring the power between power supply 120 and hoist motor control 122.

As is apparent, hoist motor control circuit E here illustrated may be incorporated in any number of configurations. For example, the disclosed circuit could be used to interrupt actuating signals between the hoist control 126 and the motor control 128. Alternately, this circuit could be used to mechanically uncouple the clutch between the motor of the lifting apparatus and the mechanism actuating the cables 17. Obviously, such alterations of the present invention may be made to suit the mechanics of the particular lifting apparatus being used in conjunction with the hoist block and spreader.

Although the foregoing invention has been described in some detail by way of illustration and example for purposes of clarity and understanding, it is understood that certain changes and modifications may be practiced within the spirit of the invention as limited only by the scope of the appended claims.

What is claimed is:

1. A coupling assembly for connecting and disconnecting a lift apparatus and hoist block with a spreader, said assembly comprises: first and second complementary attachment members attached to said hoist block and spreader; means for gathering said first and second attachment members into preliminary alignment with one another from positions of said hoist block overlying said spreader; said gathering means including diverging surfaces attached to said first attachment member and complementary converging surfaces attached to said second attachment members; said attachment members having means for registering said members to a position of precise alignment; means for guiding said attachment members from the position of preliminary alignment to the position of precise alignment in response to movement of said hoist block toward said spreader; an interconnecting member mounted for reciprocal movement to one of said attachment members and a complementary structure defined in the other of said members for registry with said interconnecting member; means for reciprocally moving said interconnecting member between a first position engaging said complementary structure and a second position retracted from said complementary structure for connecting and disconnecting said attachment members, respectively; means for locking said interconnecting member in said second position including a lever pivotally attached to said interconnecting member at a first location and hingeably attached to said one of said members at a second location; knee hinge members interconnecting said lever and said one of said members at a third location; each of said knee hinge members foldable with respect to said remaining knee hinge members between a first collapsed position and a second extended position whereby in said second extended position said interconnecting member is maintained from said complementary structure.

2. A coupling assembly for connecting and disconnecting a lift apparatus and hoist block with a spreader, said assembly comprises: first and second complementary attachment members attached to said hoist block and spreader; means for gathering said first and second attachment members into preliminary alignment with one another from positions of said hoist block overlying said spreader; said gathering means including diverging surfaces attached to said first attachment member and complementary converging surfaces attached to said second attachment members; said attachment members having means for registering said members to a position of precise alignment; means for guiding said attachment members from the position of preliminary alignment to the position of precise alignment in response to movement of said hoist block toward said spreader; an interconnecting member mounted for reciprocal movement to one of said attachment members and a complementary structure defined in the other of said members for registry with said interconnecting member; means for reciprocally moving said interconnecting member between a first position engaging said complementary structure and a second position retracted from said complementary structure for connecting and disconnecting said attachment members, respectively; means for locking said interconnecting member in said first position including a lever pivotally attached to said interconnecting member at a first location and hingeably attached to said one of said members at second location; means for biasing said lever as attached to said interconnecting member; and means for cooperatively locking said lever opposing said bias with one of said attachment members whereby said interconnecting member is maintained in said complementary structure interconnecting said attachment members.

References Cited

UNITED STATES PATENTS

| | | | |
|---|---|---|---|
| 895,370 | 8/1908 | Hendershot | 287—103 |
| 879,005 | 2/1908 | Rockstrott | 74—520 |
| 1,557,580 | 10/1925 | Gover | 74—102 |
| 1,940,242 | 12/1933 | Burgess | 294—67(4A) |
| 3,121,583 | 2/1964 | Damm | 294—83 |
| 3,361,274 | 1/1968 | Goldman | 294—67 |

HARVEY C. HORNSBY, Primary Examiner

U.S. Cl. X.R.

294—83; 287—103